(12) United States Patent
Hayakawa et al.

(10) Patent No.: US 11,560,444 B2
(45) Date of Patent: Jan. 24, 2023

(54) METHOD OF PRODUCING BLOCK COPOLYMER CAPABLE OF CREATING SPECIFIC STRUCTURE PATTERN

(71) Applicants: TOKYO OHKA KOGYO CO., LTD., Kawasaki (JP); TOKYO INSTITUTE OF TECHNOLOGY, Tokyo (JP)

(72) Inventors: Teruaki Hayakawa, Tokyo (JP); Seina Yamazaki, Tokyo (JP); Akiyoshi Yamazaki, Kawasaki (JP); Daisuke Kawana, Kawasaki (JP); Yoshitaka Komuro, Kawasaki (JP); Takaya Maehashi, Kawasaki (JP); Rin Odashima, Kawasaki (JP)

(73) Assignees: TOKYO OHKA KOGYO CO., LTD., Kawasaki (JP); TOKYO INSTITUTE OF TECHNOLOGY, Tokyo (JP)

( * ) Notice: Subject to any disclaimer, the term of this patent is extended or adjusted under 35 U.S.C. 154(b) by 397 days.

(21) Appl. No.: 16/780,643

(22) Filed: Feb. 3, 2020

(65) Prior Publication Data

US 2020/0262960 A1 Aug. 20, 2020

(30) Foreign Application Priority Data

Feb. 14, 2019 (JP) .............................. JP2019-024619

(51) Int. Cl.
*C08F 297/02* (2006.01)
*C09D 153/00* (2006.01)

(52) U.S. Cl.
CPC .......... *C08F 297/02* (2013.01); *C09D 153/00* (2013.01)

(58) Field of Classification Search
CPC ... C08F 297/02; C08F 297/026; C09D 153/00
See application file for complete search history.

(56) References Cited

U.S. PATENT DOCUMENTS

| | | |
|---|---|---|
| 2016/0257789 A1 | 9/2016 | Seshimo et al. |
| 2018/0244856 A1 | 8/2018 | Hayakawa et al. |
| 2019/0270852 A1 | 9/2019 | Yamazaki et al. |

FOREIGN PATENT DOCUMENTS

| | | |
|---|---|---|
| JP | 2008-036491 A | 2/2008 |
| JP | 2016-166323 A | 9/2016 |
| JP | 2018-141046 A | 9/2018 |
| JP | 2019-151769 A | 9/2019 |

OTHER PUBLICATIONS

William Hinsberg et al, Proceedings of SPIE, vol. 7637, pp. 76370G-1-76370G-11, 2010.
Frank S. Bates et al, Annu. Rev. Phys. Chem. vol. 41, pp. 525-557, 1990.
Yamazaki et al, Polymer preprints, Japan vol. 67 No. 1, 2018, 1E17, May 8, 2018.
Yamazaki et al, Polymer preprints, Japan vol. 67 No.1, 2018, 1E17, May 23, 2018.
Office Action issued in corresponding Japanese Patent Application No. 2019-024619, dated Oct. 18, 2022.

*Primary Examiner* — Jeffrey C Mullis
(74) *Attorney, Agent, or Firm* — Knobbe, Martens, Olson & Bear LLP

(57) ABSTRACT

A block copolymer including a first block consisting of a polymer having a repeating structure of a structural unit (u1) containing no silicon atom, and a second block consisting of a polymer having a repeating structure of a structural unit (u2) containing a silicon atom, the second block containing a block (b21) consisting of a polymer having a repeating structure of a structural unit (u21) represented by general formula (u2-1) shown below, and the volume ratio of the first block, based on all blocks constituting the block copolymer being 42 to 44 vol %:

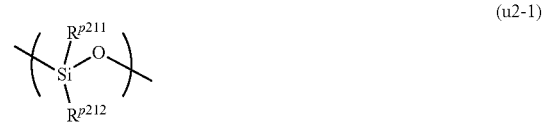

In which $R^{P211}$ represents an alkyl group, a halogenated alkyl group, a hydrogen atom, or an organic group having a polar group; and $R^{P212}$ is a group derived from a compound represented by formula $SHR^{r1}$, wherein $R^{r1}$ represents a hydrocarbon group having 1 to 5 carbon atoms optionally having a substituent.

7 Claims, 2 Drawing Sheets

METHOD OF PRODUCING BLOCK COPOLYMER CAPABLE OF CREATING SPECIFIC STRUCTURE PATTERN

TECHNICAL FIELD

The present invention relates to a block copolymer, and a method of producing structure containing phase-separated structure.

Priority is claimed on Japanese Patent Application No. 2019-024619, filed Feb. 14, 2019, the content of which is incorporated herein by reference.

DESCRIPTION OF RELATED ART

Recently, as further miniaturization of large scale integrated circuits (LSI) proceeds, a technology for processing a more delicate structure is demanded. In response to such demand, attempts have been started to be made on a technology in which a fine pattern is formed using a phase-separated structure formed by self-assembly of a block copolymer having mutually incompatible blocks bonded together. (For example, Patent Literature 1).

In order to utilize a phase-separated structure of a block copolymer, it is required that the self-assembled nanostructure formed by microphase separation be formed only in a specific region and arranged in a desired direction. For realizing position control and orientational control, processes such as graphoepitaxy to control phase-separated pattern by a guide pattern and chemical epitaxy to control phase-separated pattern by difference in the chemical state of the substrate are proposed (see, for example, Non-Patent Literature 1).

A block copolymer forms a regular periodic structure by phase separation. The periodic structure changes to a cylinder, a lamellar or a sphere, depending on the volume ratio or the like of the polymer components. Further, it is known that the period depends on the molecular weight.

Attempts have been made to form fine patterns having a perpendicular cylinder shape in which cylinders are oriented in a perpendicular direction, a horizontal cylinder shape in which cylinders are oriented in a horizontal direction, and a perpendicular lamellar shape in which lamellars are oriented in a perpendicular direction. For example, in Patent Literature 2, by introducing a polar group into a side chain terminal of a block copolymer composed of polystyrene and a siloxane derivative, a vertical lamellar shape pattern in which lamellar shapes are vertically oriented as shown in FIG. 1A. Attempts have been made to improve the vertical alignment property of the.

DOCUMENTS OF RELATED ART

Patent Literature

[Patent Literature 1] Japanese Unexamined Patent Application, First Publication No. 2008-36491
[Patent Literature 2] Japanese Unexamined Patent Application, First Publication No. 2016-166323

Non-Patent Documents

[Non-Patent Literature 1] Proceedings of SPIE (U.S.), vol. 7637, pp. 76370G-1 (2010)
[Non-Patent Document 2] Annu. Rev. Phys. Chem. 41 525 (1990)

SUMMARY OF THE INVENTION

In recent years, as the technology of LSI has further advanced, a phase separation structure having not only a fine structure but also a complicated structure is desired.

When attempt is made to control the shape of the phase-separation structure of the block copolymer, it is common to adjust the amount of the monomer added and the amount of the polymerization initiator added during the polymerization of the block copolymer. Therefore, in order to obtain a phase-separation structure having a desired shape, it was necessary to polymerize the block copolymer for each shape. In addition, in the adjustment of the amount of the monomer or the polymerization initiator added during the polymerization of the block copolymer, it has been difficult to obtain a block copolymer capable of forming a phase-separated structure having a complicated structure such as a perforated lamellar structure for example, as shown in FIG. 1B, in which two kinds of shapes, a lamellar shape and a cylinder shape vertically oriented to the lamellar shape, are alternately and regularly arranged.

The present invention takes the above circumstances into consideration, with an object of providing a block copolymer capable of forming a complicated structure by self-directed assembly, and a method of producing a structure containing a phase-separated structure.

A first aspect of the present invention is a block copolymer including a first block consisting of a polymer having a repeating structure of a structural unit (u1) containing no silicon atom, and a second block consisting of a polymer having a repeating structure of a structural unit (u2) containing a silicon atom, the second block containing a block (b21) consisting of a polymer having a repeating structure of a structural unit (u21) represented by general formula (u2-1) shown below, and the volume ratio of the first block, based on all blocks constituting the block copolymer being 42 to 44 vol %.

[Chemical Formula 1]

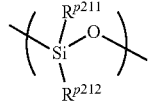

(u2-1)

In the formula, $R^{P211}$ represents an alkyl group, a halogenated alkyl group, a hydrogen atom, or an organic group having a polar group; and $R^{P212}$ is a group derived from a compound represented by general formula (Th-1) shown below:

[Chemical Formula 2]

HS—$R^{r1}$  (Th-1)

In the formula, $R^{r1}$ represents a hydrocarbon group having 1 to 5 carbon atoms optionally having a substituent.

A second aspect of the present invention is a method of producing a structure containing a phase-separated structure, the method including step (i) in which a layer containing the block copolymer according to the first aspect is formed on a substrate, and step (ii) in which the layer containing the block copolymer is phase-separated.

According to the present invention, there are provided a block copolymer capable of forming a complicated structure by self-directed assembly, and a method of producing a structure containing a phase-separated structure.

DETAILED DESCRIPTION OF THE INVENTION

Figure 1A:
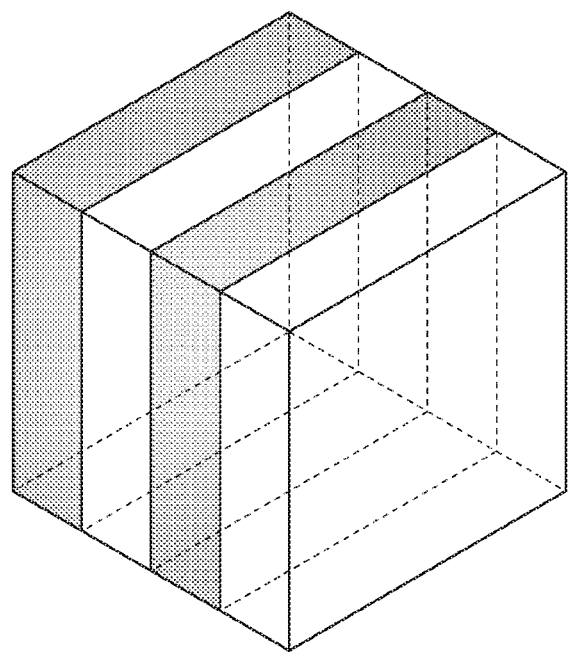
FIG. 1A is a schematic diagram showing a phase-separated structure having a vertical lamellar structure.

In the present description and claims, the term "aliphatic" is a relative concept used in relation to the term "aromatic", and defines a group or compound that has no aromaticity.

The term "alkyl group" includes linear, branched or cyclic, monovalent saturated hydrocarbon, unless otherwise specified.

The term "alkylene group" includes linear, branched or cyclic, divalent saturated hydrocarbon, unless otherwise specified. The same applies for the alkyl group within an alkoxy group.

A "halogenated alkyl group" is a group in which part or all of the hydrogen atoms of an alkyl group is substituted with a halogen atom. Examples of the halogen atom include a fluorine atom, a chlorine atom, a bromine atom and an iodine atom.

A "fluorinated alkyl group" or a "fluorinated alkylene group" is a group in which part or all of the hydrogen atoms of an alkyl group or an alkylene group have been substituted with a fluorine atom.

The term "structural unit" refers to a monomer unit that contributes to the formation of a polymeric compound (resin, polymer, copolymer).

A "structural unit derived from an acrylate ester" refers to a structural unit that is formed by the cleavage of the ethylenic double bond of an acrylate ester.

An "acrylate ester" refers to a compound in which the terminal hydrogen atom of the carboxy group of acrylic acid ($CH_2=CH-COOH$) has been substituted with an organic group.

The acrylate ester may have the hydrogen atom bonded to the carbon atom on the α-position substituted with a substituent. The substituent that substitutes the hydrogen atom bonded to the carbon atom on the α-position is atom other than hydrogen or a group, and examples thereof include an alkyl group of 1 to 5 carbon atoms, a halogenated alkyl group of 1 to 5 carbon atoms and a hydroxyalkyl group. A carbon atom on the α-position of an acrylate ester refers to the carbon atom bonded to the carbonyl group, unless specified otherwise.

Hereafter, an acrylate ester having the hydrogen atom bonded to the carbon atom on the α-position substituted with a substituent is sometimes referred to as "α-substituted acrylate ester". Further, acrylate esters and α-substituted acrylate esters are collectively referred to as "(α-substituted) acrylate ester".

A "structural unit derived from a hydroxystyrene derivative" refers to a structural unit that is formed by the cleavage of the ethylenic double bond of a hydroxystyrene derivative.

The term "hydroxystyrene derivative" includes compounds in which the hydrogen atom at the α-position of hydroxystyrene has been substituted with another substituent such as an alkyl group or a halogenated alkyl group; and derivatives thereof. Examples of the derivatives thereof include hydroxystyrene in which the hydrogen atom of the hydroxy group has been substituted with an organic group and may have the hydrogen atom on the α-position substituted with a substituent; and hydroxystyrene which has a substituent other than a hydroxy group bonded to the benzene ring and may have the hydrogen atom on the α-position substituted with a substituent. Here, the α-position (carbon atom on the α-position) refers to the carbon atom having the benzene ring bonded thereto, unless specified otherwise.

As the substituent which substitutes the hydrogen atom on the α-position of hydroxystyrene, the same substituents as those described above for the substituent on the α-position of the aforementioned α-substituted acrylate ester can be mentioned.

A "structural unit derived from vinylbenzoic acid or a vinylbenzoic acid derivative" refers to a structural unit that is formed by the cleavage of the ethylenic double bond of vinylbenzoic acid or a vinylbenzoic acid derivative.

The term "vinylbenzoic acid derivative" includes compounds in which the hydrogen atom at the α-position of vinylbenzoic acid has been substituted with another substituent such as an alkyl group or a halogenated alkyl group; and derivatives thereof. Examples of the derivatives thereof include benzoic acid in which the hydrogen atom of the carboxy group has been substituted with an organic group and may have the hydrogen atom on the α-position substituted with a substituent; and benzoic acid which has a substituent other than a hydroxy group and a carboxy group bonded to the benzene ring and may have the hydrogen atom on the α-position substituted with a substituent. Here, the α-position (carbon atom on the α-position) refers to the carbon atom having the benzene ring bonded thereto, unless specified otherwise.

A "styrene derivative" refers to a compound in which the hydrogen atom on the α-position of styrene is substituted with a substituent such as an alkyl group, a halogenated alkyl group or the like.

A "structural unit derived from styrene" or "structural unit derived from a styrene derivative" refers to a structural unit that is formed by the cleavage of the ethylenic double bond of styrene or a styrene derivative.

As the alkyl group as a substituent on the α-position, a linear or branched alkyl group is preferable, and specific examples include a methyl group, an ethyl group, a propyl group, an isopropyl group, an n-butyl group, an isobutyl group, a tert-butyl group, a pentyl group, an isopentyl group and a neopentyl group.

Specific examples of the halogenated alkyl group as the substituent on the α-position include groups in which part or all of the hydrogen atoms of the aforementioned "alkyl group as the substituent on the α-position" are substituted with halogen atoms. Examples of the halogen atom include a fluorine atom, a chlorine atom, a bromine atom and an iodine atom, and a fluorine atom is particularly desirable.

Specific examples of the hydroxyalkyl group as the substituent on the α-position include groups in which part or all of the hydrogen atoms of the aforementioned "alkyl group as the substituent on the α-position" are substituted with a hydroxy group. The number of hydroxy groups within the hydroxyalkyl group is preferably 1 to 5, and most preferably 1.

The term "exposure" is used as a general concept that includes irradiation with any form of radiation.

<<Block Copolymer>>

The block copolymer according to the present embodiment includes a first block consisting of a polymer having a repeating structure of a structural unit (u1) containing no silicon atom, and a second block consisting of a polymer having a repeating structure of a structural unit (u2) containing a silicon atom.

In the present embodiment, a "block copolymer" refers to a polymeric material in which plurality of blocks (partial constitutional components in which the same kind of structural unit is repeatedly bonded) are bonded. As the blocks constituting the block copolymer, 2 kinds of blocks may be used, or 3 or more kinds of blocks may be used.

In the block copolymer according to the present embodiment, the volume ratio of the first block, based on all blocks constituting the block copolymer is 42 to 44 vol %. By virtue of the volume ratio of the first block based on all blocks constituting the block copolymer being 42 to 44 vol %, a phase-separated structure having a complicated structure such as a perforated lamellar structure for example, as shown in FIG. 1B, in which two kinds of shapes, a lamellar shape and a cylinder shape vertically oriented to the lamellar shape, are alternately and regularly arranged may be formed. Further, by using a suitable brush composition, the orientation with respect to the substrate may be controlled.

<First Block>

In the present embodiment, the first block is not particularly limited as long as it consists of a polymer having a repeating structure of a structural unit (u1) containing no silicon atom. Examples of the first block include a block consisting of a polymer having a repeating structure of a structural unit (u11) represented by general formula (u1-1) shown below (hereafter, sometimes referred to as "block (u11)"), and a block consisting of a structural unit (u12) derived from an acrylate ester in which a hydrogen atom bonded to the carbon atom on the α-position may be substituted with a substituent (hereafter, sometimes referred to as "block (u12)").

[Chemical Formula 3]

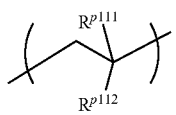

(u1-1)

wherein $R^{P111}$ represents an alkyl group, a halogenated alkyl group or a hydrogen atom; and $R^{P112}$ represents an aromatic cyclic group which may have a substituent.

(Structural Unit (u11))

In general formula (u1-1), $R^{P111}$ represents an alkyl group, a halogenated alkyl group or a hydrogen atom.

As the alkyl group for $R^{P111}$, a linear or branched alkyl group is preferable, and specific examples include alkyl groups of 1 to 5 carbon atoms, such as a methyl group, an ethyl group, a propyl group, an isopropyl group, an n-butyl group, an isobutyl group, a tert-butyl group, a pentyl group, an isopentyl group and a neopentyl group.

Examples of the halogenated alkyl group for $R^{P111}$ include groups in which part or all of the hydrogen atoms within the aforementioned alkyl groups has been substituted with a halogen atom. Examples of the halogen atom include a fluorine atom, a chlorine atom, a bromine atom and an iodine atom.

Among these examples, as $R^{P111}$, an alkyl group, a halogenated alkyl group or a hydrogen atom is preferable, an alkyl group of 1 to 5 carbon atoms, a halogenated alkyl group of 1 to 5 carbon atoms or a hydrogen atom is more preferable, and a methyl group or a hydrogen atom is most preferable.

In general formula (u1-1), $R^{P112}$ represents an aromatic cyclic group which may have a substituent.

Examples of the aromatic cyclic group for $R^{P112}$ include a phenyl group, a naphthyl group, a biphenyl group, an anthracenyl group, and a pyridyl group. Among these examples, as the aromatic cyclic group for $R^{P112}$, a phenyl group or a naphthyl group is preferable, and a phenyl group is more preferable.

Examples of substituents for the aromatic cyclic group represented by $R^{P112}$ include an alkyl group of 1 to 5 carbon atoms, a halogen atom, and a halogenated alkyl group of 1 to 5 carbon atoms.

Specific examples of the alkyl group of 1 to 5 carbon atoms include a methyl group, an ethyl group, a propyl group, an isopropyl group, an n-butyl group, an isobutyl group, a tert-butyl group, a pentyl group, an isopentyl group, and a neopentyl group.

Examples of the halogen atom include a fluorine atom, a chlorine atom, a bromine atom and an iodine atom.

Examples of the halogenated alkyl group include groups in which part or all of the hydrogen atoms within the aforementioned alkyl groups has been substituted with the aforementioned halogen atoms.

(Structural Unit (u12))

In the present embodiment, examples of the structural unit (u12) include a structural unit derived from methyl acrylate, a structural unit derived from ethyl acrylate, a structural unit derived from propyl acrylate, a structural unit derived from n-butyl acrylate, a structural unit derived from t-butyl acrylate, a structural unit derived from cyclohexyl acrylate, a structural unit derived from octyl acrylate, a structural unit derived from nonyl acrylate, a structural unit derived from hydroxyethyl acrylate, a structural unit derived from hydroxypropyl acrylate, a structural unit derived from benzyl acrylate, a structural unit derived from anthracene acrylate, a structural unit derived from glycidyl acrylate, a structural unit derived from 3,4-epoxycyclohexylmethane acrylate, a structural unit derived from methyl methacrylate, a structural unit derived from ethyl methacrylate, a structural unit derived from propyl methacrylate, a structural unit derived from n-butyl methacrylate, a structural unit derived from t-butyl methacrylate, a structural unit derived from cyclohexyl methacrylate, a structural unit derived from octyl methacrylate, a structural unit derived from nonyl methacrylate, a structural unit derived from hydroxyethyl methacrylate, a structural unit derived from hydroxypropyl methacrylate, a structural unit derived from benzyl methacrylate, a structural unit derived from anthracene methacrylate, a structural unit derived from glycidyl methacrylate, and a structural unit derived from 3,4-epoxycyclohexylmethane methacrylate.

Among these examples, as the structural unit (u12), a structural unit derived from methyl acrylate, a structural unit derived from ethyl acrylate, a structural unit derived from t-butyl acrylate, a structural unit derived from methyl methacrylate, a structural unit derived from ethyl methacrylate, or a structural unit derived from t-butyl methacrylate is preferable.

In the present embodiment, as the first block, the block (u11) is preferable. In the case where the block copolymer of the present embodiment has a combination of the block (u11) and the second block described later, a phase-separated structure having a complicated structure such as the aforementioned perforated lamellar structure may be reliably formed.

<Second Block>

In the present embodiment, the second block contains a block (b21) consisting of a polymer having a repeating structure of a structural unit represented by general formula (u2-1) shown below.

[Chemical Formula 4]

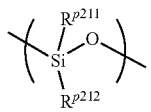

(u2-1)

In the formula, $R^{P211}$ represents an alkyl group, a halogenated alkyl group, a hydrogen atom, or an organic group having a polar group; and $R^{P212}$ is a group derived from a compound represented by general formula (Th-1) shown below:

[Chemical Formula 5]

(Th-1)

In the formula, $R^{r1}$ represents a hydrocarbon group having 1 to 5 carbon atoms optionally having a substituent.

(Structural Unit (u21))

In general formula (u2-1), $R^{P211}$ represents an alkyl group, a halogenated alkyl group, a hydrogen atom, or an organic group having a polar group.

Examples of the organic group in the "organic group having a polar group" for $R^{P211}$ include a monovalent hydrocarbon group which may have a substituent. The hydrocarbon group may be either an aliphatic hydrocarbon group or an aromatic hydrocarbon group.

Aliphatic Hydrocarbon Group for $R^{P211}$

The "aliphatic hydrocarbon group" refers to a hydrocarbon group that has no aromaticity. The aliphatic hydrocarbon group may be saturated or unsaturated. In general, the aliphatic hydrocarbon group is preferably saturated.

Examples of the aliphatic hydrocarbon group include a linear or branched aliphatic hydrocarbon group, and an aliphatic hydrocarbon group containing a ring in the structure thereof can be given.

Linear or Branched Aliphatic Hydrocarbon Group

Examples of the linear or branched aliphatic hydrocarbon group include an alkyl group, an alkenyl group and an alkynyl group. Examples of the alkyl group include alkyl groups of 1 to 20 carbon atoms (preferably 1 to 10 carbon atoms, more preferably 1 to 6 carbon atoms) such as a methyl group, an ethyl group, a propyl group, an isopropyl group, a butyl group, an isobutyl group, a s-butyl group, a t-butyl group, a pentyl group, a hexyl group, a heptyl group, an octyl group, a 2-ethylhexyl group, a nonyl group and a decyl group. Examples of the alkenyl group include alkenyl groups of 2 to 20 carbon atoms (preferably 2 to 10 carbon atoms, and more preferably 2 to 6 carbon atoms), such as a vinyl group, an allyl group and a butenyl group. Examples of the alkynyl group include alkynyl groups of 2 to 20 carbon atoms (preferably 2 to 10 carbon atoms, and more preferably 2 to 6 carbon atoms), such as an ethynyl group and a propynyl group.

The linear or branched aliphatic hydrocarbon group may or may not have a substituent. Examples of the substituent include a fluorine atom, a fluorinated alkyl group of 1 to 5 carbon atoms, and a carbonyl group.

Aliphatic Hydrocarbon Group Containing a Ring in the Structure Thereof

As examples of the hydrocarbon group containing a ring in the structure thereof, an alicyclic hydrocarbon group, a group in which the alicyclic hydrocarbon group is bonded to the terminal of the aforementioned chain-like aliphatic hydrocarbon group, and a group in which the alicyclic group is interposed within the aforementioned linear or branched aliphatic hydrocarbon group, can be given.

Examples of the alicyclic hydrocarbon group include a 3- to 8-membered ring cycloalkyl group, such as a cyclopropyl group, a cyclobutyl group, a cyclopentyl group, a cyclohexyl group, a cycloheptyl group or a cyclooctyl group; a 3- to 8-membered ring cycloalkenyl group, such as a cyclopentenyl group or a cyclohexenyl group; a bridged cyclic hydrocarbon group of 4 to 20 carbon atoms (preferably 7 to 12 carbon atoms), such as an adamantyl group or a norbornyl group.

The cyclic aliphatic hydrocarbon group may or may not have a substituent. Examples of the substituent include an alkyl group, an alkoxy group, a halogen atom, a halogenated alkyl group, a hydroxyl group and a carbonyl group.

The alkyl group as the substituent is preferably an alkyl group of 1 to 5 carbon atoms, and a methyl group, an ethyl group, a propyl group, an n-butyl group or a tert-butyl group is particularly desirable.

The alkoxy group as the substituent is preferably an alkoxy group having 1 to 5 carbon atoms, more preferably a methoxy group, ethoxy group, n-propoxy group, isopropoxy group, n-butoxy group or tert-butoxy group, and most preferably a methoxy group or an ethoxy group.

Examples of the halogen atom for the substituent include a fluorine atom, a chlorine atom, a bromine atom and an iodine atom, and a fluorine atom is preferable.

Examples of the halogenated alkyl group for the substituent include groups in which part or all of the hydrogen atoms within the aforementioned alkyl groups has been substituted with the aforementioned halogen atoms.

The cyclic aliphatic hydrocarbon group may have part of the carbon atoms constituting the ring structure thereof substituted with a substituent containing a hetero atom. As the substituent containing a hetero atom, —O—, —C(=O)—O—, —S—, —S(=O)$_2$— or —S(=O)$_2$—O— is preferable.

Aromatic Hydrocarbon Group for $R^{P211}$

The aromatic hydrocarbon group is a hydrocarbon group having at least one aromatic ring.

The aromatic ring is not particularly limited, as long as it is a cyclic conjugated compound having (4n+2)π electrons, and may be either monocyclic or polycyclic. The aromatic ring preferably has 5 to 30 carbon atoms, more preferably 5 to 20, still more preferably 6 to 15, and most preferably 6 to 12. Here, the number of carbon atoms within a substituent(s) is not included in the number of carbon atoms of the aromatic hydrocarbon group. Examples of the aromatic ring include aromatic hydrocarbon rings, such as benzene, naphthalene, anthracene and phenanthrene; and aromatic hetero rings in which part of the carbon atoms constituting the aforementioned aromatic hydrocarbon rings has been substituted with a hetero atom. Examples of the hetero atom within the aromatic hetero rings include an oxygen atom, a sulfur atom and a nitrogen atom.

Specific examples of the aromatic hetero ring include a pyridine ring and a thiophene ring.

Specific examples of the aromatic hydrocarbon group include a group in which one hydrogen atom has been removed from the aforementioned aromatic hydrocarbon ring or aromatic hetero ring (aryl group or heteroaryl group); a group in which one hydrogen atom has been removed from an aromatic compound having two or more aromatic rings (biphenyl, fluorene or the like); and a group in which one hydrogen atom of the aforementioned aromatic hydrocarbon ring or aromatic hetero ring has been substituted with an alkylene group (an arylalkyl group such as a benzyl group, a phenethyl group, a 1-naphthylmethyl group, a 2-naphthylmethyl group, a 1-naphthylethyl group, or a 2-naphthylethyl group). The alkylene group which is bonded to the aforementioned aryl group or heteroaryl group preferably has 1 to 4 carbon atoms, more preferably 1 or 2 carbon atoms, and most preferably 1 carbon atom.

With respect to the aromatic hydrocarbon group, the hydrogen atom within the aromatic hydrocarbon group may be substituted with a substituent. For example, the hydrogen atom bonded to the aromatic ring within the aromatic hydrocarbon group may be substituted with a substituent. Examples of substituents include an alkyl group, an alkoxy group, a halogen atom, a halogenated alkyl group, and a hydroxyl group.

The alkyl group as the substituent is preferably an alkyl group of 1 to 5 carbon atoms, and a methyl group, an ethyl group, a propyl group, an n-butyl group or a tert-butyl group is particularly desirable.

As the alkoxy group, the halogen atom and the halogenated alkyl group for the substituent, the same groups as the aforementioned substituent groups for substituting a hydrogen atom within the cyclic aliphatic hydrocarbon group can be used.

Examples of the polar group in the "organic group having a polar group" for $R^{P211}$ include —OH, —C(=O)OH, —O—, —C(=O)—, —C(=O)—O—, —SH, —SO$_3$H, —S—, —C(=S)—, —S(=O)—, —S(=O)$_2$—, —S(=O)$_2$—O—, —NH$_2$, —N=, —NH—, and —C(=O)NH—.

In general formula (u2-1), the alkyl group for $R^{P211}$ is the same as defined for the alkyl group for the aliphatic hydrocarbon group represented by $R^{P211}$.

Examples of the halogenated alkyl group for $R^{P211}$ include groups in which part or all of the hydrogen atoms within the aforementioned alkyl groups has been substituted with a halogen atom. Examples of the halogen atom include a fluorine atom, a chlorine atom, a bromine atom and an iodine atom.

In formula (u2-1), $R^{P212}$ is a group derived from a compound represented by formula (Th-1).

In formula (Th-1), the hydrocarbon group having 1 to 5 carbon atoms represented by $R^{r1}$ is preferably a linear or branched alkyl group, more preferably a methyl group, an ethyl group, a propyl group, an isopropyl group, a butyl group, an isobutyl group, a s-butyl group, a t-butyl group or a pentyl group, still more preferably a methyl group, an ethyl group or a propyl group, and most preferably a propyl group.

In formula (Th-1), examples of the substituent for the hydrocarbon group having 1 to 5 carbon atoms represented by IV include an alkyl group, an alkoxy group, a halogen atom, a halogenated alkyl group and a hydroxy group.

The alkyl group as the substituent is preferably an alkyl group of 1 to 5 carbon atoms, and a methyl group, an ethyl group, a propyl group, an n-butyl group or a tert-butyl group is particularly desirable.

As the alkoxy group, the halogen atom and the halogenated alkyl group for the substituent, the same groups as the aforementioned substituent groups for substituting a hydrogen atom within the cyclic aliphatic hydrocarbon group can be used.

The structural unit (u21) is preferably a structural unit represented by general formula (u2-1-1) shown below.

[Chemical Formula 6]

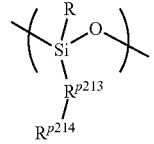

(u2-1-1)

In the formula, R represents a hydrogen atom, an alkyl group of 1 to 5 carbon atoms or a halogenated alkyl group of 1 to 5 carbon atoms; $R^{P213}$ represents a divalent linking group; and $R^{P214}$ is a group represented by general formula (Th-r-1) shown below.

[Chemical Formula 7]

—SR$^{r1}$                                (Th-r-1)

In the formula, $R^{r1}$ represents a hydrocarbon group having 1 to 5 carbon atoms optionally having a substituent.

In general formula (u2-1-1), R represents a hydrogen atom, an alkyl group of 1 to 5 carbon atoms or a halogenated alkyl group of 1 to 5 carbon atoms.

Examples of the alkyl group of 1 to 5 carbon atoms represented by R include a methyl group, an ethyl group, a propyl group, an isopropyl group, an n-butyl group, an isobutyl group, a tert-butyl group, a pentyl group, an isopentyl group and a neopentyl group.

Examples of the halogenated alkyl group for R include groups in which part or all of the hydrogen atoms within the aforementioned alkyl groups has been substituted with a halogen atom. Examples of the halogen atom include a fluorine atom, a chlorine atom, a bromine atom and an iodine atom.

Among these examples, as R, a methyl group or a hydrogen atom is preferable.

In general formula (u2-1-1), $R^{P213}$ represents a divalent linking group. The divalent linking group is not particularly limited, and preferable examples thereof include a divalent hydrocarbon group which may have a substituent and a divalent linking group containing a hetero atom.

Divalent Hydrocarbon Group which May have a Substituent:

In the case where $R^{P213}$ is a divalent linking group which may have a substituent, the hydrocarbon group may be either an aliphatic hydrocarbon group or an aromatic hydrocarbon group.

Aliphatic Hydrocarbon Group for $R^{P213}$

The "aliphatic hydrocarbon group" refers to a hydrocarbon group that has no aromaticity. The aliphatic hydrocarbon group may be saturated or unsaturated. In general, the aliphatic hydrocarbon group is preferably saturated.

Examples of the aliphatic hydrocarbon group include a linear or branched aliphatic hydrocarbon group, and an aliphatic hydrocarbon group containing a ring in the structure thereof can be given.

Linear or Branched Aliphatic Hydrocarbon Group

The linear or branched aliphatic hydrocarbon group preferably has 1 to 10 carbon atoms, more preferably 1 to 6, still more preferably 1 to 4, and most preferably 1 to 3.

As the linear aliphatic hydrocarbon group, a linear alkylene group is preferable. Specific examples thereof include a methylene group [—$CH_2$—], an ethylene group [—$(CH_2)_2$—], a trimethylene group [—$(CH_2)_3$—], a tetramethylene group [—$(CH_2)_4$—] and a pentamethylene group [—$(CH_2)_5$—].

As the branched aliphatic hydrocarbon group, branched alkylene groups are preferred, and specific examples include various alkylalkylene groups, including alkylmethylene groups such as —$CH(CH_3)$—, —$CH(CH_2CH_3)$—, —$C(CH_3)_2$—, —$C(CH_3)(CH_2CH_3)$—, —$C(CH_3)(CH_2CH_2CH_3)$—, and —$C(CH_2CH_3)_2$—; alkylethylene groups such as —$CH(CH_3)CH_2$—, —$CH(CH_3)CH(CH_3)$—, —$C(CH_3)_2CH_2$—, —$CH(CH_2CH_3)CH_2$—, and —$C(CH_2CH_3)_2$—$CH_2$—; alkyltrimethylene groups such as —$CH(CH_3)CH_2CH_2$—, and —$CH_2CH(CH_3)CH_2$—; and alkyltetramethylene groups such as —$CH(CH_3)CH_2CH_2CH_2$—, and —$CH_2CH(CH_3)CH_2CH_2$—. As the alkyl group within the alkylalkylene group, a linear alkyl group of 1 to 5 carbon atoms is preferable.

The linear or branched aliphatic hydrocarbon group may or may not have a substituent. Examples of the substituent include a fluorine atom, a fluorinated alkyl group of 1 to 5 carbon atoms, and a carbonyl group.

Aliphatic Hydrocarbon Group Containing a Ring in the Structure Thereof

As examples of the hydrocarbon group containing a ring in the structure thereof, a cyclic aliphatic hydrocarbon group containing a hetero atom in the ring structure thereof and may have a substituent (a group in which two hydrogen atoms have been removed from an aliphatic hydrocarbon ring), a group in which the cyclic aliphatic hydrocarbon group is bonded to the terminal of the aforementioned chain-like aliphatic hydrocarbon group, and a group in which the cyclic aliphatic group is interposed within the aforementioned linear or branched aliphatic hydrocarbon group, can be given. As the linear or branched aliphatic hydrocarbon group, the same groups as those described above can be used.

The cyclic aliphatic hydrocarbon group preferably has 3 to 20 carbon atoms, and more preferably 3 to 12 carbon atoms.

The cyclic aliphatic hydrocarbon group may be either a polycyclic group or a monocyclic group. As the monocyclic aliphatic hydrocarbon group, a group in which 2 hydrogen atoms have been removed from a monocycloalkane is preferable. The monocycloalkane preferably has 3 to 6 carbon atoms, and specific examples thereof include cyclopentane and cyclohexane. As the polycyclic group, a group in which two hydrogen atoms have been removed from a polycycloalkane is preferable, and the polycyclic group preferably has 7 to 12 carbon atoms. Examples of the polycycloalkane include adamantane, norbornane, isobornane, tricyclodecane and tetracyclododecane.

The cyclic aliphatic hydrocarbon group may or may not have a substituent. Examples of the substituent include an alkyl group, an alkoxy group, a halogen atom, a halogenated alkyl group, a hydroxyl group and a carbonyl group.

The alkyl group as the substituent is preferably an alkyl group of 1 to 5 carbon atoms, and a methyl group, an ethyl group, a propyl group, an n-butyl group or a tert-butyl group is particularly desirable.

The alkoxy group as the substituent is preferably an alkoxy group having 1 to 5 carbon atoms, more preferably a methoxy group, ethoxy group, n-propoxy group, isopropoxy group, n-butoxy group or tert-butoxy group, and most preferably a methoxy group or an ethoxy group.

Examples of the halogen atom for the substituent include a fluorine atom, a chlorine atom, a bromine atom and an iodine atom, and a fluorine atom is preferable.

Examples of the halogenated alkyl group for the substituent include groups in which part or all of the hydrogen atoms within the aforementioned alkyl groups has been substituted with the aforementioned halogen atoms.

The cyclic aliphatic hydrocarbon group may have part of the carbon atoms constituting the ring structure thereof substituted with a substituent containing a hetero atom. As the substituent containing a hetero atom, —O—, —C(=O)—O—, —S—, —S(=O)$_2$— or —S(=O)$_2$—O— is preferable.

Aromatic Hydrocarbon Group for $R^{P213}$

The aromatic hydrocarbon group is a hydrocarbon group having at least one aromatic ring.

The aromatic ring is not particularly limited, as long as it is a cyclic conjugated compound having (4n+2)π electrons, and may be either monocyclic or polycyclic. The aromatic ring preferably has 5 to 30 carbon atoms, more preferably 5 to 20, still more preferably 6 to 15, and most preferably 6 to 12. Here, the number of carbon atoms within a substituent(s) is not included in the number of carbon atoms of the aromatic hydrocarbon group. Examples of the aromatic ring include aromatic hydrocarbon rings, such as benzene, naphthalene, anthracene and phenanthrene; and aromatic hetero rings in which part of the carbon atoms constituting the aforementioned aromatic hydrocarbon rings has been substituted with a hetero atom. Examples of the hetero atom within the aromatic hetero rings include an oxygen atom, a sulfur atom and a nitrogen atom.

Specific examples of the aromatic hetero ring include a pyridine ring and a thiophene ring.

Specific examples of the aromatic hydrocarbon group include a group in which two hydrogen atoms have been removed from the aforementioned aromatic hydrocarbon ring or aromatic hetero ring (arylene group or heteroarylene group); a group in which two hydrogen atoms have been removed from an aromatic compound having two or more aromatic rings (biphenyl, fluorene or the like); and a group in which one hydrogen atom of the aforementioned aromatic hydrocarbon ring or aromatic hetero ring has been substituted with an alkylene group (a group in which one hydrogen atom has been removed from the aryl group within the aforementioned arylalkyl group such as a benzyl group, a phenethyl group, a 1-naphthylmethyl group, a 2-naphthylmethyl group, a 1-naphthylethyl group, or a 2-naphthylethyl group, or a heteroarylalkyl group). The alkylene group which is bonded to the aforementioned aryl group or heteroaryl group preferably has 1 to 4 carbon atoms, more preferably 1 or 2 carbon atoms, and most preferably 1 carbon atom.

With respect to the aromatic hydrocarbon group, the hydrogen atom within the aromatic hydrocarbon group may be substituted with a substituent. For example, the hydrogen atom bonded to the aromatic ring within the aromatic hydrocarbon group may be substituted with a substituent. Examples of substituents include an alkyl group, an alkoxy group, a halogen atom, a halogenated alkyl group, and a hydroxyl group.

The alkyl group as the substituent is preferably an alkyl group of 1 to 5 carbon atoms, and a methyl group, an ethyl group, a propyl group, an n-butyl group or a tert-butyl group is particularly desirable.

As the alkoxy group, the halogen atom and the halogenated alkyl group for the substituent, the same groups as the aforementioned substituent groups for substituting a hydrogen atom within the cyclic aliphatic hydrocarbon group can be used.

Divalent Linking Group Containing a Hetero Atom

In the case where $R^{P213}$ represents a divalent linking group containing a hetero atom, preferable examples of the linking group include —O—, —C(=O)—O—, —C(=O)—, —O—C(=O)—O—, —C(=O)—NH—, —NH—, —NH—C(=NH)— (may be substituted with a substituent such as an alkyl group, an acyl group or the like), —S—, —S(=O)$_2$—, —S(=O)$_2$—O—, and a group represented by general formula: —Y$^{21}$—O—Y$^{22}$—, —Y$^{21}$—O—, —Y$^{21}$—C(=O)—O—, —C(=O)—O—Y$^{21}$—, —[Y$^{21}$—C(=O)—O]$_{m'}$—Y$^{22}$—, —Y$^{21}$—O—C(=O)—Y$^{22}$— or —Y$^{21}$—S(=O)$_2$—O—Y$^{22}$— [in the formulae, Y$^{21}$ and Y$^{22}$ each independently represents a divalent hydrocarbon group which may have a substituent, O represents an oxygen atom, and m' represents an integer of 0 to 3].

In the case where the divalent linking group containing a hetero atom is —C(=O)—NH—, —C(=O)—NH—C(=O)—, —NH— or —NH—C(=NH)—, H may be substituted with a substituent such as an alkyl group, an acyl group or the like. The substituent (an alkyl group, an acyl group or the like) preferably has 1 to 10 carbon atoms, more preferably 1 to 8, and most preferably 1 to 5.

In general formulae —Y$^{21}$—O—Y$^{22}$—, —Y$^{21}$—O—, —Y$^{21}$—C(=O)—O—, —C(=O)—O—Y$^{21}$—, —[Y$^{21}$—C(=O)—O]$_{m'}$—Y$^{22}$—, —Y$^{21}$—O—C(=O)—Y$^{22}$— or —Y$^{21}$—S(=O)$_2$—O—Y$^{22}$—, Y$^{21}$ and Y$^{22}$ each independently represents a divalent hydrocarbon group which may have a substituent. Examples of the divalent hydrocarbon group include the same groups as those described above as the "divalent hydrocarbon group which may have a substituent" in the explanation of the aforementioned divalent linking group.

As Y$^{21}$, a linear aliphatic hydrocarbon group is preferable, more preferably a linear alkylene group, still more preferably a linear alkylene group of 1 to 5 carbon atoms, and a methylene group or an ethylene group is particularly desirable.

As Y$^{22}$, a linear or branched aliphatic hydrocarbon group is preferable, and a methylene group, an ethylene group or an alkylmethylene group is more preferable. The alkyl group within the alkylmethylene group is preferably a linear alkyl group of 1 to 5 carbon atoms, more preferably a linear alkyl group of 1 to 3 carbon atoms, and most preferably a methyl group.

In the group represented by the formula —[Y$^{21}$—C(=O)—O]$_{m''}$—Y$^{22}$—, m" represents an integer of 0 to 3, preferably an integer of 0 to 2, more preferably 0 or 1, and most preferably 1. Namely, it is particularly desirable that the group represented by the formula —[Y$^{21}$—C(=O)—O]$_{m''}$—Y$^{22}$— is a group represented by the formula —Y$^{21}$—C(=O)—O—Y$^{22}$—. Among these, a group represented by the formula —(CH$_2$)$_{a'}$—C(=O)—O—(CH$_2$)$_{b'}$— is preferable. In the formula, a' is an integer of 1 to 10, preferably an integer of 1 to 8, more preferably an integer of 1 to 5, still more preferably 1 or 2, and most preferably 1. b' is an integer of 1 to 10, preferably an integer of 1 to 8, more preferably an integer of 1 to 5, still more preferably 1 or 2, and most preferably 1.

As $R^{P213}$, a linear or alkylene group of 1 to 10 carbon atoms is preferable, a linear or alkylene group of 1 to 6 carbon atoms is more preferable, a linear or alkylene group of 1 to 3 carbon atoms still is preferable, and a methylene group is most preferable.

In formula (u2-1-1), $R^{P214}$ is a group represented by general formula (Th-r-1).

In formula (Th-r-1), $R^{r1}$ is the same as defined for $R^{r1}$ in the aforementioned formula (Th-1). Among these examples, as $R^{r1}$, a methyl group, an ethyl group or a propyl group is preferable, and a propyl group is more preferable.

In formula (u2-1-1), as $R^{P214}$, a group represented by the formula: —S—(CH$_2$)—OH is preferable. In the formula, n is an integer of 1 to 5 preferably an integer of 1 to 3, and more preferably 3.

Specific examples of the structural unit (u21) are shown below.

[Chemical Formula 8]

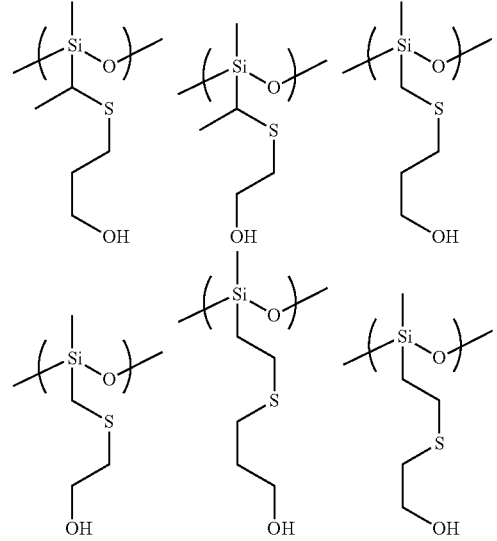

In the polymer constituting the second block, the amount of the structural (u21), based on the combined total (100 vol %) of all structural units constituting the polymer is preferably 42 to 62 vol %, more preferably 44 to 60 vol %, and still more preferably 45 to 58 vol %.

When the amount of the structural unit (u21) is within the above-mentioned preferable range, the volume ratio of the first block based on all blocks constituting the block copolymer may be reliably controlled to be within the range of 42 to 44 vol %.

In the present embodiment, the polymer constituting the second block may have a structural unit (u22) containing a silicon atom other than the structural unit (u21).

(Structural Unit (u22))

The structural unit (u22) is not particularly limited as long as it is a structural unit other than the structural unit (u21) and containing a silicon atom. As the structural unit (u22), a structural unit (221) derived from siloxane or a structural unit (u222) represented by general formula (u2-2-2) shown below is preferable, and a structural unit (221) derived from siloxane is more preferable.

[Chemical Formula 9]

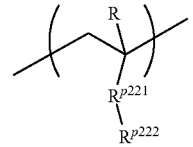

(u2-2-2)

In the formula, R represents a hydrogen atom, an alkyl group of 1 to 5 carbon atoms or a halogenated alkyl group of 1 to 5 carbon atoms; $R^{P221}$ represents a divalent linking group; and $R^{P222}$ represents an organic group having a silicon atom.

(Structural Unit (221))

Examples of the structural unit (221) include a structural unit derived from methylvinylsiloxane, a structural unit derived from dimethylsiloxane, a structural unit derived from diethylsiloxane, a structural unit derived from diphenylsiloxane, and a structural unit derived from methylphenylsiloxane.

Among these examples, as the structural unit (u221), a structural unit derived from methylvinylsiloxane is preferable.

(Structural Unit (222))

In general formula (u2-2-2), R represents a hydrogen atom, an alkyl group of 1 to 5 carbon atoms or a halogenated alkyl group of 1 to 5 carbon atoms, and is the same as defined for R in general formula (u2-1-1).

Among these examples, as R, a methyl group or a hydrogen atom is preferable.

In general formula (u2-2-2), $R^{P221}$ represents a divalent linking group. The divalent linking group represented by $R^{P221}$ is the same as defined for the divalent linking group represented by $R^{P213}$ in general formula (u2-1-1). Among these examples, as the divalent linking group represented by $R^{P221}$, a divalent linking group containing a hetero atom or a divalent aromatic hydrocarbon group is preferable, —O—, —C(=O)—O—, —C(=O)—, —O—C(=O)—O—, —C(=O)—NH—, —NH—, —NH—C(=NH)— (H may be substituted with a substituent such as an alkyl group, an acyl group or the like), —S—, —S(=O)$_2$—, —S(=O)$_2$—O—, a group represented by general formula: —Y$^{21}$—O—Y$^{22}$—, —Y$^{21}$—O—, —Y$^{21}$—C(=O)—O—, —C(=O)—O—Y$^{21}$—, —[Y$^{21}$—C(=O)—O]$_{m''}$—Y$^{22}$—, —Y$^{21}$—O—C(=O)—Y$^{22}$— or —Y$^{21}$—S(=O)$_2$—O—Y$^{22}$— [in the formulae, Y$^{21}$ and Y$^{22}$ each independently represents a divalent hydrocarbon group which may have a substituent, O represents an oxygen atom, and m" represents an integer of 0 to 3], a phenylene group, a naphthylene group, an anthracenylene group or a phenanthrenylene group is more preferable, and —C(=O)—O— or a phenylene group is still more preferable.

In general formula (u2-2-2), $R^{P222}$ represents an organic group having a silicon atom. $R^{P222}$ is not particularly limited, and is preferably at least one member selected from the group consisting of an organic group represented by any one of chemical formulae ($R^{P222}$-1) to ($R^{P222}$-3) shown below.

[Chemical Formula 10]

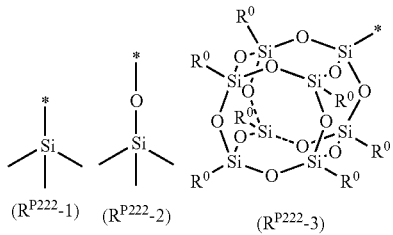

In the formula, $R^0$ represents a monovalent hydrocarbon group which may have a substituent. The plurality of $R^0$ may be the same or different from each other.

In general formula ($R^{P222}$-3), the "monovalent hydrocarbon group which may have a substituent" represented by $R^0$ is the same as defined for the "monovalent hydrocarbon group which may have a substituent" described above for $R^{P211}$ in the aforementioned general formula (u2-1). Among these examples, as $R^0$, an ethyl group or an isobutyl group is preferable.

In the polymer constituting the second block, the amount of the structural (u22), based on the combined total (100 vol %) of all structural units constituting the polymer is preferably 42 to 62 vol %, more preferably 44 to 60 vol %, and still more preferably 45 to 58 vol %.

When the amount of the structural unit (u22) is within the above-mentioned preferable range, the volume ratio of the first block based on all blocks constituting the block copolymer may be reliably controlled to be within the range of 42 to 44 vol %.

In the present embodiment, the number average molecular weight (Mn) (the polystyrene equivalent value determined by gel permeation chromatography) of the block copolymer is preferably 5,000 to 2,000,000, more preferably 5,000 to 1,000,000, and still more preferably 5,000 to 500,000.

The polydispersity (Mw/Mn) of the block copolymer is preferably 1.0 to 3.0, more preferably 1.0 to 1.5, and still more preferably 1.0 to 1.3. Mw indicates the weight average molecular weight.

In the present embodiment, the amount of the first block based on the total amount (100 vol %) of the first block and the second block is preferably 38 to 66 vol %, more preferably 40 to 64 vol %, and still more preferably 42 to 62 vol %.

Further, the amount of the second block based on the total amount (100 vol %) of the first block and the second block is preferably 34 to 62 vol %, more preferably 36 to 60 vol %, and still more preferably 38 to 58 vol %.

When the amount of the first block and the second block is within the above-mentioned preferable range, the volume ratio of the first block based on all blocks constituting the block copolymer may be reliably controlled to be within the range of 42 to 44 vol %.

The block copolymer according to the present embodiment may be preferably used as a resin composition for forming a phase-separated structure. In the case of using the block copolymer as a resin composition for forming a phase-separated structure, it is preferable to prepare the resin composition by dissolving the block copolymer according to the present embodiment in an organic solvent.

Organic Solvent

The organic solvent may be any organic solvent which can dissolve the respective components to give a uniform solution, and one or more kinds of any organic solvent can be appropriately selected from those which have been conventionally known as solvents for a film composition containing a resin as a main component.

Examples thereof include halogenated hydrocarbons such as methylchloride, dichloromethane, chloroform, ethyl chloride, dichloroethane, n-propylchloride, n-butylchloride and chlorobenzene; lactones such as γ-butyrolactone; ketones such as acetone, methyl ethyl ketone, cyclohexanone, methyl-n-pentyl ketone, methyl isopentyl ketone, and 2-heptanone (methylamyl ketone); polyhydric alcohols, such as ethylene glycol, diethylene glycol, propylene glycol and dipropylene glycol; compounds having an ester bond, such as ethylene glycol monoacetate, diethylene glycol monoacetate, propylene glycol monoacetate, and dipropylene glycol monoacetate; polyhydric alcohol derivatives including compounds having an ether bond, such as a monoalkylether (e.g., monomethylether, monoethylether, monopropylether or monobutylether) or monophenylether of any of these polyhydric alcohols or compounds having an ester bond (among these, propylene glycol monomethyl ether acetate (PGMEA) and propylene glycol monomethyl ether (PGME) are preferable); cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; and aromatic organic solvents such as anisole, ethylbenzylether, cresylmethylether, diphenylether, dibenzylether, phenetole, butylphenylether, ethylbenzene, diethylbenzene, pentylbenzene, isopropylbenzene, toluene, xylene, cymene and mesitylene.

These solvents can be used individually, or in combination as a mixed solvent.

Among these examples, chloroform, 2-heptanone, propylene glycol monomethyl ether acetate (PGMEA), propylene glycol monomethyl ether (PGME), cyclohexanone and EL is preferable.

Further, among the mixed solvents, a mixed solvent obtained by mixing PGMEA with a polar solvent is preferable. The mixing ratio (weight ratio) of the mixed solvent can be appropriately determined, taking into consideration the compatibility of the PGMEA with the polar solvent, but is preferably in the range of 1:9 to 9:1, more preferably from 2:8 to 8:2. For example, when EL is mixed as the polar solvent, the PGMEA:EL weight ratio is preferably from 1:9 to 9:1, and more preferably from 2:8 to 8:2. Alternatively, when PGME is mixed as the polar solvent, the PGMEA:PGME weight ratio is preferably from 1:9 to 9:1, more preferably from 2:8 to 8:2, and still more preferably 3:7 to 7:3. Alternatively, when PGME and cyclohexanone is mixed as the polar solvent, the PGMEA:(PGME+cyclohexanone) weight ratio is preferably from 1:9 to 9:1, more preferably from 2:8 to 8:2, and still more preferably 3:7 to 7:3.

Further, as the organic solvent for the resin composition for forming a phase-separated structure, a mixed solvent of γ-butyrolactone with PGMEA, EL or the aforementioned mixed solvent of PGMEA with a polar solvent, is also preferable. The mixing ratio (former:latter) of such a mixed solvent is preferably from 70:30 to 95:5.

The amount of the organic solvent in the resin composition for forming a phase-separated structure is not particularly limited, and is adjusted appropriately to a concentration that enables application of a coating solution depending on the thickness of the coating film. In general, the organic solvent is used in an amount that yields a solid content for the block copolymer that is within a range from 0.2 to 70% by weight, and preferably from 0.2 to 50% by weight.

The block copolymer according to the present embodiment is capable of forming a regular periodic structure. Therefore, the block copolymer according to the present embodiment is preferable for self-directed assembly lithography.

The block copolymer according to the present embodiment includes a first block consisting of a polymer having a repeating structure of the structural unit (u1), and a second block consisting of a polymer having a repeating structure of the structural unit (u2), and the volume ratio of the first block based on all blocks constituting the block copolymer is 42 to 44 vol %. By virtue of such configuration, a phase-separated structure having a complicated structure such as a perforated lamellar structure in which two kinds of shapes, a lamellar shape and a cylinder shape vertically oriented to the lamellar shape, are alternately and regularly arranged may be formed.

<<Method of Producing Block Copolymer>>

The block copolymer according to the present embodiment may be produced, for example, by a method including: step (a) in which a first block consisting of a polymer having a repeating structure of a structural unit (u11) represented by the aforementioned general formula (u1-1) or a polymer having a repeating structure of a structural unit (u12) derived from an acrylate ester in which a hydrogen atom bonded to the carbon atom on the α-position may be substituted with a substituent is prepared; step (b) in which the first block prepared in step (a) is subjected to addition polymerization with a monomer (m21') which derives a structural unit (u21') represented by general formula (u2-1') shown below, to prepare a block copolymer precursor consisting of the first block and a block (b21'), and step (c) in which the block copolymer precursor prepared in step (b) is reacted with a compound represented by the aforementioned general formula (Th-1).

[Chemical Formula 11]

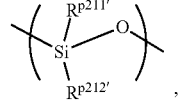

(u 2-1)

In the formula, $R^{P211'}$ represents an alkyl group, a halogenated alkyl group, a hydrogen atom or an organic group containing a reactive group; and $R^{P212'}$ represents an organic group containing a reactive group.

(Step (a))

In step (a), a first block is prepared. The method of preparing the first block is not particularly limited, and a conventional polymerization method may be used. For example, a monomer which derived a structural unit (u11) or a monomer which derives a structural unit (u12) may be subjected to a polymerization reaction in an organic solvent in the presence of a living anion polymerization initiator such as sec-butyllithium (SecBuLi). The reaction temperature is not particularly limited, and a temperature at which the polydispersity of the first block becomes narrow is preferable.

(Step (b))

In step (b), the first block prepared in step (a) is subjected to addition polymerization with a monomer (m21') which derives a structural unit (u21') represented by general formula (u2-1'), to prepare a block copolymer precursor consisting of the first block and a block (b21').

In general formula (u2-1'), $R^{P211'}$ represents an alkyl group, a halogenated alkyl group, a hydrogen atom or an organic group containing a reactive group.

An "organic group containing a reactive group" includes a reactive group itself.

A reactive group refers to a group which is capable of reacting with another portion by a chemical reaction.

Examples of the reactive group include a vinyl group, an allyl group, a (meth)acryloyl group, a styryl group, an oxiranyl group, an oxetanyl group, a carboxy group, a hydroxy group, a thiacyclopropyl group, a sulfanyl group, an isocyanato group, an amino group and an ureido group. Among these examples, as the reactive group, a vinyl group or an allyl group is preferable, and a vinyl group is most preferable.

The organic group for $R^{P211'}$ is not particularly limited, and examples thereof include the "monovalent hydrocarbon group which may have a substituent" represented by $R^{P211'}$ in the aforementioned general formula (u2-1).

The alkyl group and the halogenated alkyl group for $R^{P211'}$ are the same as defined for the alkyl group and the halogenated alkyl group for $R^{P211}$ in the aforementioned general formula (u2-1), respectively.

Among these examples, as $R^{P211'}$, an alkyl group, a halogenated alkyl group or a hydrogen atom is preferable, an alkyl group of 1 to 5 carbon atoms, a halogenated alkyl group of 1 to 5 carbon atoms or a hydrogen atom is more preferable, and a methyl group or a hydrogen atom is most preferable.

In general formula (u2-1'), $R^{P212'}$ represents an organic group containing a reactive group.

The organic group containing a reactive group for $R^{P212'}$ is the same as defined for the organic group containing a reactive group for $R^{P211'}$.

Among these examples, as $R^{P212'}$, a vinyl group, an organic group containing a vinyl group or an allyl group is preferable, and a vinyl group is most preferable.

(Step (c))

In step (c), the block copolymer precursor prepared in step (b) is reacted with a compound represented by the aforementioned general formula (Th-1) (ene-thiol reaction). By such reaction, in the structural unit (u21') of the block (b21'), a group derived from the compound represented by general formula (Th-1) is introduced into the organic group containing a reactive group represented by $R^{P211'}$ or $R^{P212'}$, so as to prepare a block copolymer in which the first block is bonded to the second block.

According to the above production method, a block copolymer precursor consisting of the first block and the block (b21') may be prepared, and then a group derived from a compound represented by the aforementioned formula (Th-1) may be introduced into the side chain of the structural unit (u21') of the block (b21'). Therefore, the volume ratio of the first block may be simply adjusted without adjusting the amount of each monomer and the amount of the polymerization initiator in the polymerization of each block. The block copolymer obtained by the above production method has the volume ratio of the first block, based on all blocks constituting the block copolymer controlled within the range of 42 to 44 vol %. Therefore, for example, a perforated lamellar structure in which two kinds of shapes, a lamellar shape and a cylinder shape vertically oriented to the lamellar shape, are alternately and regularly arranged may be formed.

<<Method of Forming Structure Containing Phase-Separated Structure>>

A method of forming a structure containing a phase-separated structure using the block copolymer according to the present embodiment will be described.

The method of producing a structure containing a phase-separated structure includes a step (i) in which a layer containing the block copolymer according to the present embodiment is formed on a substrate, and a step (ii) in which the layer containing the block copolymer is phase-separated.

In the method of producing a structure containing a phase-separated structure according to the present embodiment, it is preferable to include, prior to the step (i), a step of applying a brush composition to form a brush layer (hereafter, referred to as "brush composition layer forming step").

Figure 1B:
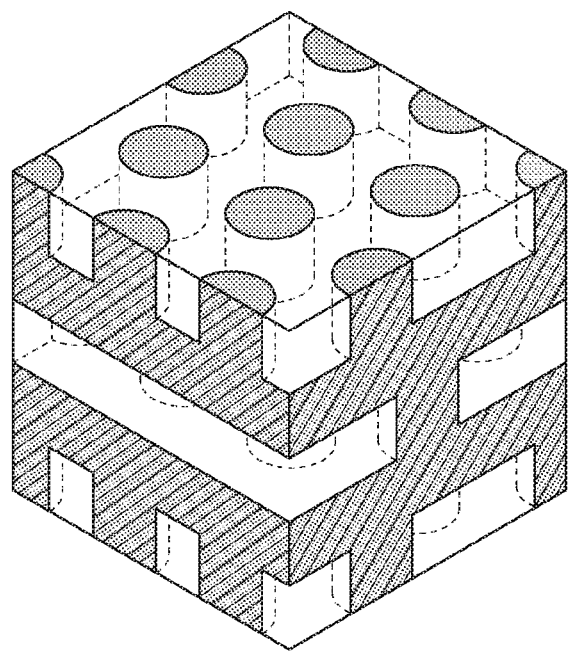
FIG. 1B is a schematic diagram showing a phase-separated structure having a perforated lamellar structure.
Figure 2:
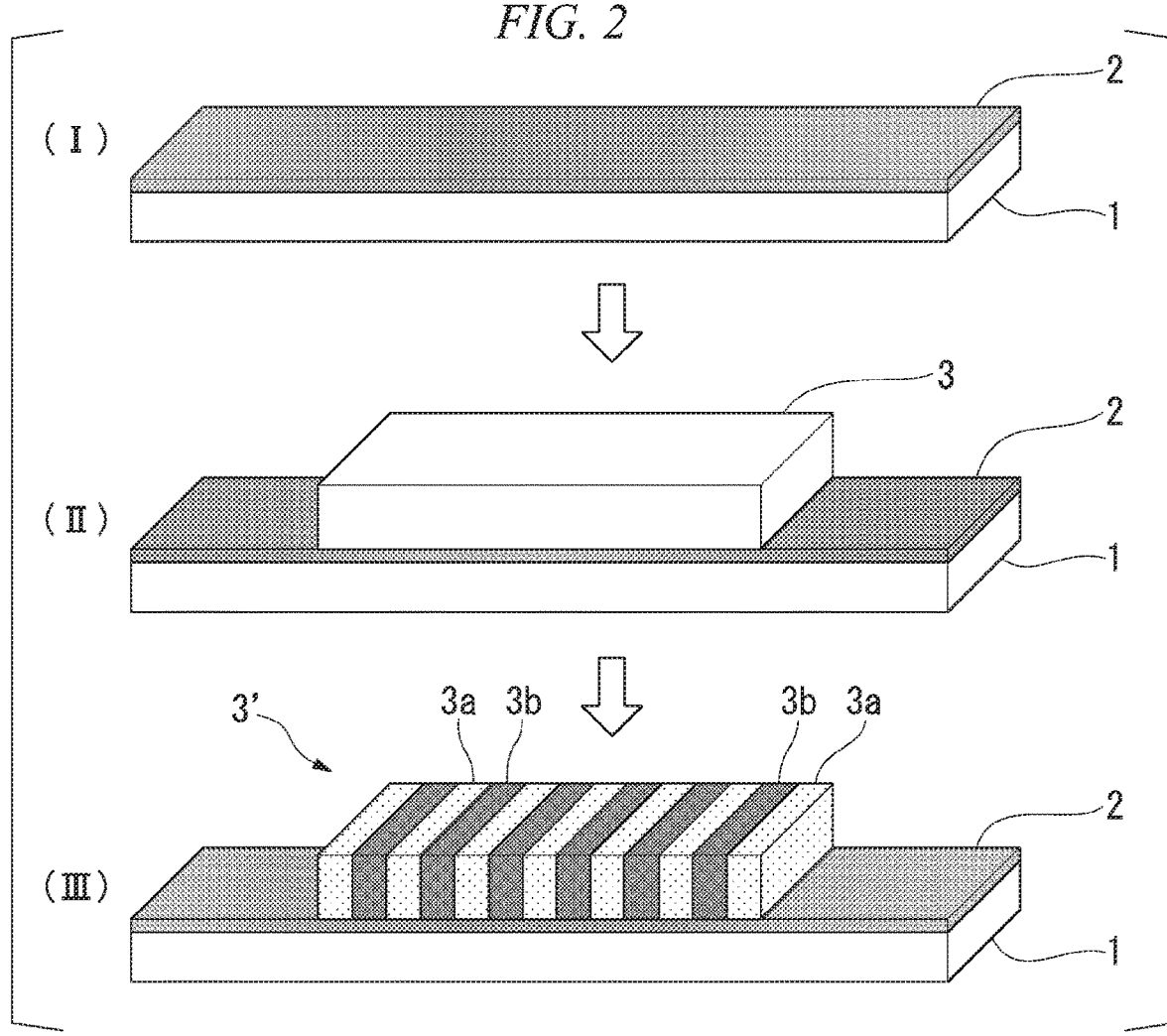
FIG. 2 is a schematic diagram showing an example of one embodiment of the method of forming a structure containing a phase-separated structure according to the present invention.

Hereinafter, the method of producing a structure containing a phase-separated structure will be specifically described with reference to FIG. 2. However, the present invention is not limited to these embodiments. For convenience of description, FIG. 2 illustrates an example of a phase-separated structure having a vertical lamellar structure. However, by the method of producing a structure containing a phase-separated structure according to the present embodiment, it is possible to form a phase-separated structure having a complicated structure such as a perforated lamellar structure, as illustrated in FIG. 1B, in which two kinds of shapes, a lamellar shape and a cylinder shape vertically oriented to the lamellar shape, are alternately and regularly arranged may be formed.

FIG. 2 shows an example of one embodiment of the method of forming a structure containing a phase-separated structure.

Firstly, a brush composition is applied to a substrate 1, so as to form a brush layer 2 (FIG. 2(I)).

Then, to the brush layer 2, a resin composition for forming a phase-separated structure is applied, so as to form a layer containing the block copolymer (BCP layer) 3 (FIG. 2(II); step (i)).

Next, heating is conducted to perform an annealing treatment, so as to phase-separate the BCP layer 3 into a phase 3a and a phase 3b. (FIG. 2 (III); step (ii)).

According to the production method of the present embodiment, that is, the production method including the steps (i) and (ii), a structure 3' containing a phase-separated structure is formed on the substrate 1 having the brush layer 2 formed thereon.

[Step (i)]

In step (i), the block copolymer is applied to the substrate 1, so as to form a BCP layer 3.

There are no particular limitations on the kind of the substrate, provided that the block copolymer can be coated on the surface of the substrate.

Examples of the substrate include a substrate constituted of an inorganic substance such as a metal (e.g., silicon, copper, chromium, iron or aluminum), glass, titanium oxide, silica or mica; and a substrate constituted of an organic substance such as an acrylic plate, polystyrene, cellulose, cellulose acetate or phenol resin.

The size and the shape of the substrate is not particularly limited. The substrate does not necessarily need to have a smooth surface, and a substrate made of various materials and having various shapes can be appropriately selected for use. For example, a multitude of shapes can be used, such as a substrate having a curved surface, a plate having an uneven surface, and a thin sheet.

On the surface of the substrate, an inorganic and/or organic film may be provided. As the inorganic film, an inorganic antireflection film (inorganic BARC) can be used. As the organic film, an organic antireflection film (organic BARC) can be used.

Before forming a BCP layer 3 on the substrate 1, the surface of the substrate 1 may be cleaned. By cleaning the surface of the substrate, application of the resin composition for forming a phase-separated structure or the brush composition to the substrate 1 may be satisfactorily performed.

As the cleaning treatment, a conventional method may be used, and examples thereof include an oxygen plasma treatment, a hydrogen plasma treatment, an ozone oxidation treatment, an acid alkali treatment, and a chemical modification treatment. For example, the substrate is immersed in an acidic solution such as a sulfuric acid/hydrogen peroxide aqueous solution, followed by washing with water and drying. Thereafter, a BCP layer 3 or a brush layer 2 is formed on the surface of the substrate.

Before forming a BCP layer 3 on the substrate 1, the surface of the substrate 1 may be subjected to a neutralization treatment.

A "neutralization treatment" is a treatment in which a surface of a substrate is modified to provide affinity for all polymers which constitute the block copolymer. By the neutralization treatment, it becomes possible to prevent only phases of specific polymers to come into contact with the surface of the substrate by phase separation. For example, prior to forming a BCP layer 3, it is preferable to form a brush layer 2 on a surface of the substrate 1, depending on the kind of block copolymer to be used. In this manner, by the phase-separation of the BCP layer 3, it becomes possible to more reliably form a phase-separated structure having a complicated structure such as a perforated lamellar structure in which two kinds of shapes, a lamellar shape and a cylinder shape vertically oriented to the lamellar shape, are alternately and regularly arranged.

Specifically, on the surface of the substrate 1, a brush layer 2 is formed using a brush composition having affinity for all polymers constituting the block copolymer.

The brush composition can be appropriately selected from conventional resin compositions used for forming a thin film, depending on the kind of polymers constituting the block copolymer.

Examples of the brush composition include a composition containing a resin which has all structural units of the polymers constituting the block copolymer, and a composition containing a resin which has all structural units having high affinity for the polymers constituting the block copolymer.

For example, when a PS-PMMA block copolymer is used, as the brush composition, it is preferable to use a resin composition containing both PS and PMMA, or a compound or a composition containing both a portion having a high affinity for an aromatic ring and a portion having a high affinity for a functional group with high polarity.

Examples of the resin composition containing both PS and PMMA include a random copolymer of PS and PMMA, an alternating polymer of PS and PMMA (a copolymer in which the respective monomers are alternately copolymerized)

Examples of the composition containing both a portion having a high affinity for PS and a portion having a high affinity for PMMA include a resin composition obtained by polymerizing at least a monomer having an aromatic ring and a monomer having a substituent with high polarity. Examples of the monomer having an aromatic ring include a monomer having a group in which one hydrogen atom has been removed from the ring of an aromatic hydrocarbon, such as a phenyl group, a biphenyl group, a fluorenyl group, a naphthyl group, an anthryl group or a phenanthryl group, or a monomer having a hetero aryl group such as the aforementioned group in which part of the carbon atoms constituting the ring of the group has been substituted with a hetero atom such as an oxygen atom, a sulfur atom or a nitrogen atom. Examples of the monomer having a substituent with high polarity include a monomer having a carboxy group, a hydroxy group, a cyano group or a hydroxyalkyl group in which part of the hydrogen atoms of the alkyl group has been substituted with fluorine atoms.

Further, as the brush composition, for example, a heat-polymerizable resin composition, or a photosensitive resin composition such as a positive resist composition or a negative resist composition can also be mentioned.

The brush layer may be formed by a conventional method.

The method of applying the brush composition to the substrate 1 to form a brush layer 2 is not particularly limited, and the brush layer 2 can be formed by a conventional method.

For example, the brush composition can be applied to the substrate 1 by a conventional method using a spinner or the like to form a coating film on the substrate 1, followed by drying, thereby forming a brush layer 2.

The drying method of the coating film is not particularly limited, provided that it can volatilize the solvent contained in the brush composition, and the coating film is immobilized on the substrate. Examples of the drying method include a method in which baking is conducted. The baking temperature is preferably 80° C. to 300° C., more preferably 90° C. to 270° C., and still more preferably 100° C. to 250° C. The baking time is preferably 30 seconds to 500 seconds, and more preferably 30 seconds to 250 seconds.

The thickness of the brush layer 2 after drying of the coating film is preferably about 3 to 100 nm, and more preferably about 5 to 50 nm.

Subsequently, on the brush layer 2, a layer 3 containing a block copolymer having a plurality of blocks bonded (BCP layer 3) is formed.

The method of forming the BCP layer 3 on the brush layer 2 is not particularly limited, and examples thereof include a method in which the resin composition is applied to the brush layer 2 by a conventional method using spin-coating or a spinner, followed by drying.

Regarding the method of drying the coating film of the resin composition, the baking is temperature is, for example, preferably from 60 to 150° C., and more preferably from 80 to 130° C. The baking time is, for example, preferably from 10 to 3,000 seconds, and more preferably from 20 to 120 seconds.

The BCP layer 3 may have a thickness satisfactory for phase-separation to occur. In consideration of the kind of the substrate 1, the structure period size of the phase-separated structure to be formed, and the uniformity of the nanostructure, the thickness is preferably 10 to 100 nm, and more preferably 15 to 80 nm.

[Step (ii)]

In step (ii), the layer 3 containing a block copolymer formed on the substrate 1 is phase-separated.

By heating the substrate 1 after step (i) to conduct the anneal treatment, the block copolymer is selectively removed, such that a phase-separated structure in which at least part of the surface of the substrate 1 is exposed is formed. That is, on the substrate 1, a structure 3' containing a phase-separated structure in which phase 3a and phase 3b are phase separated is produced.

The anneal treatment is preferably conducted at a temperature at least as high as the glass transition temperature of the block copolymer used and lower than the heat decomposition temperature. For example, in the case where the block copolymer according to the present embodiment is used, the anneal treatment is preferably conducted at 40 to 350° C., more preferably 50 to 300° C., and most preferably 70 to 120° C. The heating time is preferably 30 to 3,600 seconds, and more preferably 120 to 600 seconds.

Further, the anneal treatment is preferably conducted in a low reactive gas such as nitrogen.

[Optional Step]

The method of forming a structure containing a phase-separated structure according to the second aspect of the present invention is not limited to the above embodiment, and may include a step (optional step) other than steps (i) and (ii).

Examples of the optional steps include a step of selectively removing a phase constituted of at least one block of the plurality of blocks constituting the block copolymer contained in the BCP layer 3 (hereafter, referred to as "step (iii)"), and a guide pattern formation step.

Step (iii)

In step (iii), from the BCP layer 3 formed on the brush layer 2, a phase constituted of at least one block of the plurality of blocks constituting the block copolymer (phase 3a and phase 3b) is selectively removed. In this manner, a fine pattern (polymeric nanostructure) can be formed.

Examples of the method of selectively removing a phase constituted of a block include a method in which an oxygen plasma treatment or a hydrogen plasma treatment is conducted on the BCP layer.

Hereafter, among the blocks constituting the block copolymer, a block which is not selectively removed is referred to as "block $P_A$", and a block to be selectively removed is referred to as "block $P_B$". For example, after the phase separation of a layer containing the block copolymer according to the present embodiment, by subjecting the layer to an oxygen plasma treatment or a hydrogen plasma treatment, the phase of the second block can be selectively removed. In such a case, the first block portion is the block $P_A$, and the second block portion is the block $P_B$.

Figure 3:
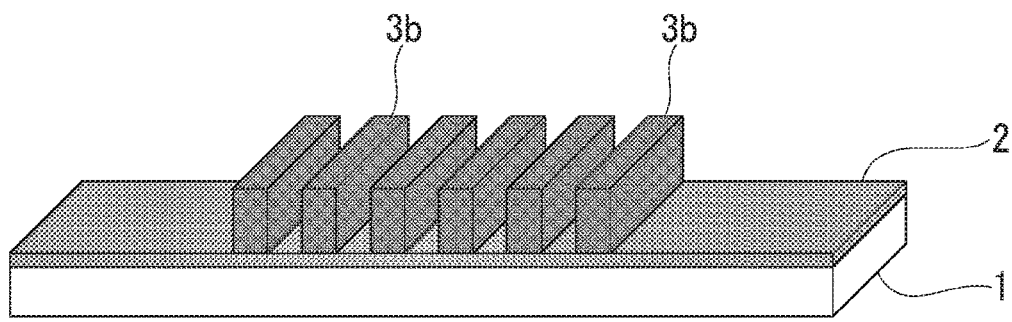
FIG. 3 is an explanatory diagram showing an example of one embodiment of an optional step.

FIG. 3 shows an example of one embodiment of step (iii).

In the embodiment shown in FIG. 3, by conducting oxygen plasma treatment on the structure 3' produced on the substrate 1 in step (ii), the phase 3a is selectively removed, and a pattern (polymeric nanostructure) constituted of phases 3b separated from each other is formed. In this case, the phase 3b is the phase constituted of the block $P_A$, and the phase 3a is the phase constituted of the block $P_B$.

The substrate 1 having a pattern formed by phase-separation of the BCP layer 3 as described above may be used as it is, or may be further heated to modify the shape of the pattern (polymeric nanostructure) on the substrate 1.

The heat treatment is preferably conducted at a temperature at least as high as the glass transition temperature of the block copolymer used and lower than the heat decomposition temperature. Further, the heating is preferably conducted in a low reactive gas such as nitrogen.

Guide Pattern Forming Step

In the method of forming a structure containing a phase-separated structure according to the second aspect of the present invention, a step of forming a guide pattern on the brush layer (guide pattern forming step) may be included. In this manner, it becomes possible to control the arrangement of the phase-separated structure.

For example, in the case of a block copolymer where a random fingerprint-patterned phase-separated structure is formed without using a guide pattern, by providing a trench pattern of a resist film on the surface of the brush layer, a phase-separated structure arranged along the trench may be obtained. The guide pattern may be provided on the brush layer 2 in accordance with the above-described principle. Further, when the surface of the guide pattern has affinity for any of the polymers constituting the block copolymer, it becomes possible to more reliably form a phase-separated structure having a complicated structure such as a perforated lamellar structure in which two kinds of shapes, a lamellar shape and a cylinder shape vertically oriented to the lamellar shape, are alternately and regularly arranged.

The guide pattern may be formed, for example, using a resist composition.

The resist composition for forming the guide pattern may be appropriately selected from resist compositions or a modified product thereof typically used for forming a resist pattern which have affinity for any of the polymers constituting the block copolymer. The resist composition may be either a positive resist composition capable of forming a positive pattern in which exposed portions of the resist film are dissolved and removed, or a negative resist pattern capable of forming a negative pattern in which unexposed portions of the resist film are dissolved and removed, but a negative resist composition is preferable. As the negative resist composition, for example, a resist composition containing an acid-generator component and a base component which exhibits decreased solubility in an organic solvent-containing developing solution under action of acid, wherein the base component contains a resin component having a structural unit which is decomposed by action of acid to exhibit increased polarity, is preferable.

When the resin composition is cast onto the brush layer having the guide pattern formed thereon, an anneal treatment is conducted to cause phase-separation. Therefore, the resist pattern for forming a guide pattern is preferably capable of forming a resist film which exhibits solvent resistance and heat resistance.

EXAMPLES

The present invention will be described more specifically with reference to the following examples, although the scope of the present invention is by no way limited by these examples.

Synthesis Example: Synthesis of Block Copolymer Precursor (Pre)

100 ml of tetrahydrofuran (THF) was added to a reaction vessel in an Ar atmosphere, followed by cooling to −78° C. A predetermined amount of SecBuLi (a mixed solution of hexane and cyclohexane) and 1.92 ml of styrene were added to the reaction vessel, followed by stirring at −78° C. for 30 minutes. Subsequently, 1.30 ml of trimethyltrivinylcyclotrisiloxane was added thereto, followed by stirring at −78° C. for 30 minutes. Then, the liquid temperature was changed to −20° C., followed by stirring for 24 hours. Thereafter, 2.00 ml of trimethylsilylchloride was added thereto, and the reaction solution was poured into 500 ml of methanol, followed by collecting the precipitated solid by filtration. The weight of the resultant after drying was 2.5 g. The obtained block copolymer precursor (Pre) had a Mn of 14,800, a PDI of 1.10 (in terms of GPC), and a styrene:methylvinylsiloxane ratio of 52:48 (molar ratio) ($^1$H-NMR). Further, the volume ratio of the styrene block based on all blocks constituting the block copolymer precursor (Pre) was 57 vol %.

[Chemical Formula 12]

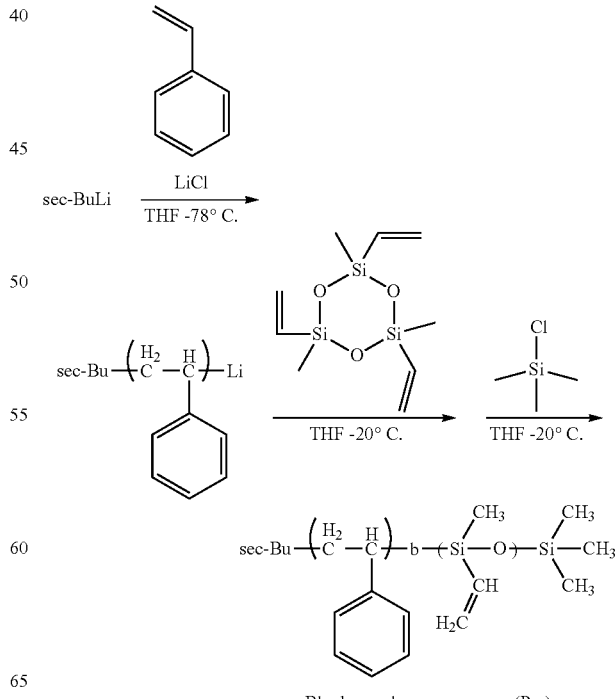

Block copolymer precursor (Pre)

Example 1: Synthesis of Block Copolymer (1)

In a nitrogen atmosphere, 1.0 g of the block copolymer precursor, 8.00 g of AIBN, 2.24 g of 3-mercapto-1-propanol and 5.0 ml of tetrahydrofuran was added to a reaction vessel, followed by stirring at 65° C. for 1 hour. The reaction solution was poured into 50 ml of hexane, followed by collecting the precipitated solid by filtration, so as to obtain 0.98 g of block copolymer (1) which is the block copolymer precursor having —S—$(CH_2)_3$—OH introduced into 83% of the side chains of the methylvinylsiloxane block. The obtained block copolymer (1) had a Mn of 20,500 and a PDI of 1.12 (in terms of GPC). Further, the volume ratio of the styrene block based on all blocks constituting block copolymer (1) was 44 vol %.

[Chemical Formula 13]

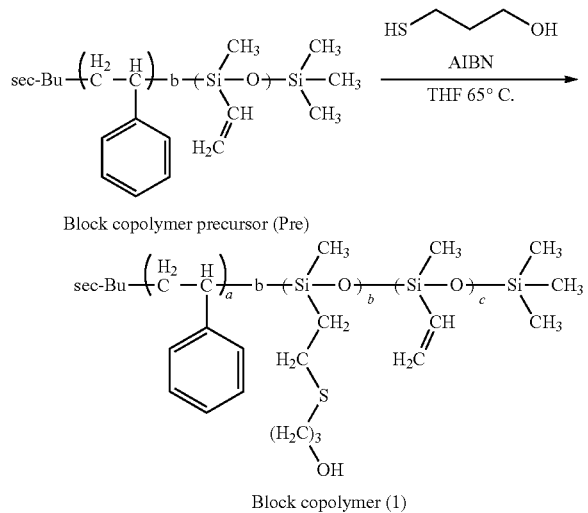

Block copolymer precursor (Pre)

Block copolymer (1)

Examples 2 and 3, Comparative Examples 1 to 3: Synthesis of Block Copolymers (2) to (6)

With the exception of changing the amount of 3-mercapto-1-propanol so as to adjust the introduction ratio of —S—$(CH_2)_3$—OH into the side chain of the methylvinylsiloxane block within the block copolymer precursor (side-chain introduction ratio) to a value indicated in Table 1, the same procedure as in Examples 1 was conducted to obtain block copolymers (2) to (6). With respect to the obtained block copolymers (2) to (6), the Mn, the PDI and the volume ratio of styrene block based on all blocks constituting the block copolymer are also indicated in Table 1.

TABLE 1

| | | Volume ratio of styrene block (vol %) | Introduction ratio of —S—$(CH_2)_3$—OH (%) | Mn | PDI |
|---|---|---|---|---|---|
| Synthesis Example 1 | Block copolymer precursor (Pre) | 57 | 0 | 14800 | 1.10 |
| Example 1 | Block copolymer (1) | 44 | 83 | 20500 | 1.12 |
| Example 2 | Block copolymer (2) | 43 | 93 | 21100 | 1.11 |
| Example 3 | Block copolymer (3) | 42 | 98 | 21500 | 1.13 |
| Comparative Example 1 | Block copolymer (4) | 53 | 18 | 16000 | 1.12 |
| Comparative Example 2 | Block copolymer (5) | 49 | 40 | 17500 | 1.11 |
| Comparative Example 3 | Block copolymer (6) | 45 | 77 | 20000 | 1.12 |

Examples 4 to 6, Comparative Examples 4 to 6: Formation of Phase-Separated Structure Each block copolymer was dissolved in THF to obtain a solution having a concentration of 10% by weight. 1.0 g of the obtained solution was weighed out in a glass container having a volume of 10 ml, and dried at room temperature under reduced pressure for one night, followed by heating at 130° C. for 24 hours, so as to obtain a sample for observation. Observation by small angle X-ray scattering analysis (SAXS) and transmission electron microscope (TEM) was conducted to distinguish the form of phase-separation. The results are shown in Table 2.

TABLE 2

| | Block copolymer | Shape of pattern |
|---|---|---|
| Example 4 | Block copolymer (1) | Perforated lamellar structure |
| Example 5 | Block copolymer (2) | Perforated lamellar structure |
| Example 6 | Block copolymer (3) | Perforated lamellar structure |
| Comparative Example 4 | Block copolymer (4) | Lamellar structure |
| Comparative Example 5 | Block copolymer (5) | Lamellar structure |
| Comparative Example 6 | Block copolymer (6) | Lamellar structure |

As seen from the results shown in Table 2, in Examples 4 to 6 applying the present invention, it was confirmed that a perforated lamellar structure, as illustrated in FIG. 1B, in which two kinds of shapes, a lamellar shape and a cylinder shape vertically oriented to the lamellar shape, are alternately and regularly arranged was formed.

On the other hand, in Comparative Examples 4 to 6, only a lamellar shape as shown in FIG. 1A was confirmed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A block copolymer comprising:
   a first block consisting of a polymer having a repeating structure of a structural unit (u1) containing no silicon atom, and a second block consisting of a polymer having a repeating structure of a structural unit (u2) containing a silicon atom,
wherein the second block comprises a block (b21) consisting of a polymer having a repeating structure of a structural unit (u21) represented by general formula (u2-1) shown below, and
wherein the volume ratio of the first block, based on all blocks constituting the block copolymer, is 42 to 44 vol %:

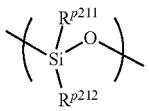

(u2-1)

wherein $R^{P211}$ represents an alkyl group, a halogenated alkyl group, a hydrogen atom, or an organic group having a polar group; and $R^{P212}$ is a group derived from a compound represented by general formula (Th-1) shown below:

HS—$R^{r1}$ (Th-1)

wherein $R^{r1}$ represents a hydrocarbon group having 1 to 5 carbon atoms optionally having a substituent.

2. The block copolymer according to claim 1, wherein the structural unit (u21) is a structural unit represented by general formula (u2-1-1) shown below:

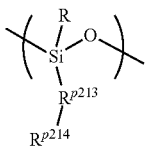

(u2-1-1)

wherein R represents a hydrogen atom, an alkyl group of 1 to 5 carbon atoms or a halogenated alkyl group of 1 to 5 carbon atoms; $R^{P213}$ represents a divalent linking group; and $R^{P214}$ is a group represented by general formula (Th-r-1) shown below —$SR^{r1}$ (Th-r-1)

wherein $R^{r1}$ represents a hydrocarbon group having 1 to 5 carbon atoms optionally having a substituent.

3. The block copolymer according to claim 1, wherein the first block is a block consisting of a polymer having a repeating structure of a structural unit (u11) represented by general formula (u1-1) shown below, or a block consisting of a structural unit (u12) derived from an acrylate ester in which a hydrogen atom bonded to the carbon atom on the α-position may be substituted with a substituent:

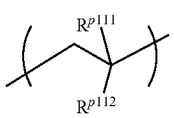

(u1-1)

wherein $R^{P111}$ represents an alkyl group, a halogenated alkyl group or a hydrogen atom; and $R^{P112}$ represents an aromatic cyclic group which may have a substituent.

4. The block copolymer according to claim 2, wherein the first block is a block consisting of a polymer having a repeating structure of a structural unit (u11) represented by general formula (u1-1) shown below, or a block consisting of a structural unit (u12) derived from an acrylate ester in which a hydrogen atom bonded to the carbon atom on the α-position may be substituted with a substituent:

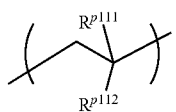

(u1-1)

wherein $R^{P111}$ represents an alkyl group, a halogenated alkyl group or a hydrogen atom; and $R^{P112}$ represents an aromatic cyclic group which may have a substituent.

5. A method of producing a structure containing a phase-separated structure, the method comprising:
step (i) in which a layer containing the block copolymer of claim 1 is formed on a substrate, and
step (ii) in which the layer containing the block copolymer is phase-separated.

6. The method according to claim 5, wherein step (i) comprises applying a brush composition to a substrate to form a brush layer, and forming a layer containing a block copolymer on the brush layer, wherein the block copolymer comprises:
a first block consisting of a polymer having a repeating structure of a structural unit (u1) containing no silicon atom, and
a second block consisting of a polymer having a repeating structure of a structural unit (u2) containing a silicon atom,
wherein the second block comprising a block (b21) consists of a polymer having a repeating structure of a structural unit (u21) represented by general formula (u2-1) shown below, and
wherein the volume ratio of the first block, based on all blocks constituting the block copolymer is 42 to 44 vol %:

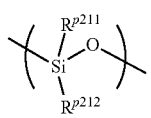

(u2-1)

wherein $R^{P211}$ represents an alkyl group, a halogenated alkyl group, a hydrogen atom, or an organic group having a polar group; and $R^{P212}$ is a group derived from a compound represented by general formula (Th-1) shown below:

HS—$R^{r1}$ (Th-1)

wherein $R^{r1}$ represents a hydrocarbon group having 1 to 5 carbon atoms optionally having a substituent.

7. The method according to claim 5, further comprising, prior to step (i), forming a guide pattern.

* * * * *